US009750044B2

United States Patent
Xu et al.

(10) Patent No.: US 9,750,044 B2
(45) Date of Patent: Aug. 29, 2017

(54) METHODS AND APPARATUS FOR NETWORK SYNCHRONIZATION

(71) Applicant: QUALCOMM Incorporated, San Diego, CA (US)

(72) Inventors: Hao Xu, San Diego, CA (US); Peter Gaal, San Diego, CA (US); Wanshi Chen, San Diego, CA (US); Tao Luo, San Diego, CA (US); Tingfang Ji, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 14/262,547

(22) Filed: Apr. 25, 2014

(65) Prior Publication Data

US 2014/0334399 A1   Nov. 13, 2014

Related U.S. Application Data

(60) Provisional application No. 61/822,246, filed on May 10, 2013.

(51) Int. Cl.
*H04W 72/12* (2009.01)
*H04W 56/00* (2009.01)

(52) U.S. Cl.
CPC ... *H04W 72/1273* (2013.01); *H04W 56/0015* (2013.01); *H04W 72/1268* (2013.01)

(58) Field of Classification Search
CPC .......... H04W 56/001; H04W 72/1273; H04W 56/0015; H04W 92/20; H04W 56/002;
(Continued)

(56) References Cited

U.S. PATENT DOCUMENTS

| 5,909,433 A * | 6/1999 | Haartsen ........... H04W 56/0085 370/337 |
| 6,459,688 B1 * | 10/2002 | Bursztejn ............. H04W 60/04 370/329 |

(Continued)

FOREIGN PATENT DOCUMENTS

WO    WO-2011019966 A2    2/2011

OTHER PUBLICATIONS

"3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 11)", 3GPP Standard; 3GPP TR 36.922, 3rd Generation Partnership Project (3GPP), Mobile Competence Centre; 650, Route Des Lucioles; F-06921 Sophia-Antipolis Cedex; France, vol. RAN WG4, No. V11.0.0, Sep. 23, 2012 (Sep. 23, 2012), pp. 1-74, XP050649923, [retrieved on Sep. 23, 2012] Section 6.4.2.

(Continued)

*Primary Examiner* — Paul H Masur
*Assistant Examiner* — Michael Phillips
(74) *Attorney, Agent, or Firm* — Patterson & Sheridan, LLP

(57) ABSTRACT

Certain aspects relate to techniques and apparatus for network synchronization by network listening. Aspects include transmitting a synchronization signal for a base station (BS) to use for acquiring synchronization with the network. Aspects include listening for a synchronization signal from a BS to use for acquiring network synchronization. In aspects, a method for wireless communications by a BS is provided. The method generally includes acquiring synchronization with a network based on a first synchronization signal transmitted from a primary BS or a secondary BS, determining a synchronization stratum for the BS based on (Continued)

whether the BS acquired synchronization with the network from the primary BS or from the secondary BS, and transmitting a second synchronization signal for one or more other BSs to use for acquiring synchronization with the network, wherein the transmitting is based, at least in part on the determined synchronization stratum.

28 Claims, 20 Drawing Sheets

(58) Field of Classification Search
CPC ....... Y02B 60/50; H04L 7/10; H04L 27/2655; H04L 27/2689; H04L 29/0854
See application file for complete search history.

(56) References Cited

U.S. PATENT DOCUMENTS

| | | | | |
|---|---|---|---|---|
| 8,971,260 | B2* | 3/2015 | Nakao | H04L 5/0053 370/252 |
| 2003/0190919 | A1* | 10/2003 | Niemenmaa | G01S 5/0273 455/456.1 |
| 2004/0125822 | A1 | 7/2004 | Jun et al. | |
| 2007/0066329 | A1* | 3/2007 | Laroia | H04B 7/2678 455/502 |
| 2007/0174465 | A1* | 7/2007 | Huang | H04W 52/0261 709/227 |
| 2010/0034163 | A1 | 2/2010 | Damnjanovic et al. | |
| 2010/0110983 | A1* | 5/2010 | Fu | H04J 11/0056 370/328 |
| 2010/0260168 | A1* | 10/2010 | Gheorghiu | H04W 56/0015 370/350 |
| 2010/0260169 | A1* | 10/2010 | Gheorghiu | H04W 56/0015 370/350 |
| 2010/0309849 | A1 | 12/2010 | Park et al. | |
| 2010/0317339 | A1* | 12/2010 | Koc | H04L 5/0007 455/424 |
| 2011/0199951 | A1* | 8/2011 | Kwon | H04W 52/0212 370/311 |
| 2011/0261758 | A1* | 10/2011 | Hapsari | H04L 47/14 370/328 |
| 2012/0170545 | A1* | 7/2012 | Yamamoto | H04W 56/002 370/330 |
| 2012/0213190 | A1* | 8/2012 | Yoon | H04L 5/001 370/329 |
| 2012/0224533 | A1* | 9/2012 | Lin | H04W 56/002 370/328 |
| 2013/0039296 | A1* | 2/2013 | Damnjanovic | H04W 72/1289 370/329 |
| 2013/0258995 | A1* | 10/2013 | Skov | H04L 5/0037 370/329 |
| 2014/0120924 | A1* | 5/2014 | Hahn | H04W 16/10 455/447 |
| 2015/0215879 | A1* | 7/2015 | Zhu | H04W 56/001 370/350 |
| 2015/0264676 | A1* | 9/2015 | Suzuki | H04W 72/0406 370/329 |

OTHER PUBLICATIONS

CMCC: "Backhaul Signaling Requirements of TDD HeNB Synchronization Using Network Listening", 3GPP Draft; R3-100316 Backhaul Signalling Requirements of TDD HENB Synchronization Using Network Listening, 3rd Generation Partnership Project (3GPP), Mobile Competence Centre; 650, Route Des Lucioles; F-06921 Sophia-Antipolis Cedex; France, vol. RAN WG3, no. Valencia, Spain; Jan. 18, 2010-Jan. 22, 2010, Jan. 15, 2010 (Jan. 15, 2010), pp. 1-4, XP050610072, [retrieved on Jan. 15, 2010] Section 2.
Partial International Search Report—PCT/US2014/035693—ISA/EPO—dated Jul. 16, 2014.
International Search Report and Written Opinion—PCT/US2014/035693/—ISA/EPO—dated Oct. 7, 2014.
Lien et al., "Network synchronization among femtocells", Globecom Workshops (GC WKSHPS). 2011 IEEE, IEEE Dec. 5, 2011 (Dec. 5, 2011), pp. 248-252, XP032124586, DOI: 10.1109/GLOCOMW.2011.6162446 ISBN: 978-1-4673-0039-1 cols. 1-6.
European Search Report—EP17156127—Search Authority—The Hague—dated Jun. 7, 2017.
European Search Report—EP17156126—Search Authority—The Hague—dated May 26, 2017.

* cited by examiner

Scenario 1

Macro cell (Outdoor) and Small cell (Outdoor)

- - - - - - - Backhaul link within cluster

─────── Backhaul link between small cells and macro cell

Note: Users are distributed both for outdoor and indoor

METHODS AND APPARATUS FOR NETWORK SYNCHRONIZATION

CLAIM OF PRIORITY UNDER 35 U.S.C. §119

This application claims benefit of U.S. Provisional Patent Application Ser. No. 61/822,246, filed May 10, 2013, which is herein incorporated by reference in its entirety.

FIELD OF THE INVENTION

Certain aspects of the disclosure generally relate to wireless communications and, more particularly, to techniques and apparatus for network synchronization (e.g., by network listening).

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. Interference caused among devices, such as base stations and UEs, may degrade performance on both the downlink and uplink.

SUMMARY

Certain aspects of the provide techniques and apparatus for network synchronization (e.g., by network listening).

Certain aspects of the present disclosure provide a method of wireless communications by a base station (BS). The method generally includes acquiring synchronization with a network based on a first synchronization signal transmitted from a primary BS or a secondary BS, determining a synchronization stratum for the BS based on whether the base station acquired synchronization with the network from the primary BS or from the secondary BS, and transmitting a second synchronization signal for one or more other BSs to use for acquiring synchronization with the network, wherein the transmitting is based, at least in part, on the determined synchronization stratum.

Certain aspects of the present disclosure provide a method of wireless communications by a BS. The method generally includes acquiring synchronization with a network in which carrier aggregation (CA) is supported, based on a first synchronization signal transmitted from a primary BS or a secondary BS, selecting an anchor carrier for transmitting a second synchronization signal and transmitting the second synchronization signal on the anchor carrier.

Certain aspects of the present disclosure provide a method of wireless communications by a BS. The method generally includes acquiring synchronization with a network, based on a first synchronization signal transmitted from a primary BS or a secondary BS and transmitting one or more bursts of second synchronization signals, wherein the one or more bursts are transmitted persistently with a relatively low duty cycle.

Certain aspects of the present disclosure provide a method of wireless communications by a BS. The method generally includes signaling to one or more user equipments (UEs) that a subframe is an uplink subframe and at least one of listening for a synchronization signal transmitted by another BS during the subframe for acquiring synchronization with a network or transmitting a synchronization signal for other BSs to listen for during the subframe.

Certain aspects of the present disclosure provide a method of wireless communications by a BS. The method generally includes receiving signaling, via a backhaul connection or over the air, indicating whether a carrier is a legacy carrier type (LCT) or a new carrier type (NCT) and listening for a synchronization signal transmitted by another BS, based on the indication.

Certain aspects of the present disclosure provide a method of wireless communications by a BS. The method generally includes determining a synchronization stratum for one or more other BSs that have acquired synchronization with a network based on a synchronization signal transmitted from a primary BS or another BS, based on whether the BS acquired synchronization with the network from the primary BS or from another BS and listening for a synchronization signal from the other BSs to use for acquiring synchronization with the network, wherein the listening is based, at least in part on the determined synchronization stratum.

Certain aspects of the present disclosure provide a method of wireless communications by a BS. The method generally includes identifying an anchor carrier for listening for a synchronization signal transmitted by one or more other BSs that have acquired synchronization with a network in which CA is supported, based on a synchronization signal transmitted from a primary BS or another BS and listening for the synchronization signals on the anchor carrier.

Certain aspects of the present disclosure provide a method of wireless communications by a BS. The method generally includes listening for one or more bursts of synchronization signals from one or more BSs that have acquired synchronization with a network based on a synchronization signal transmitted from a primary BS or another BS, wherein the one or more bursts are transmitted persistently with a relatively low duty cycle, and acquiring synchronization with the network based on the one or more bursts of synchronization signals.

Certain aspects of the present disclosure provide an apparatus for wireless communications by a BS. The apparatus generally includes means for acquiring synchronization with a network based on a first synchronization signal transmitted from a primary BS or a secondary BS, means for determining a synchronization stratum for the BS based on whether the BS acquired synchronization with the network from the primary BS or from the secondary BS, and means for transmitting a second synchronization signal for one or more other BSs to use for acquiring synchronization with the network, wherein the transmitting is based, at least in part, on the determined synchronization stratum.

Certain aspects of the present disclosure provide an apparatus for wireless communications by a BS. The apparatus generally includes at least one processor configured to acquire synchronization with a network based on a first synchronization signal transmitted from a primary BS or a secondary BS, determine a synchronization stratum for the BS based on whether the base station acquired synchronization with the network from the primary BS or from the secondary BS, and transmit a second synchronization signal for one or more other BSs to use for acquiring synchronization with the network, wherein the transmitting is based, at least in part, on the determined synchronization stratum. The apparatus generally also includes a memory coupled to the at least one processor.

Certain aspects of the present disclosure also provide various apparatuses and program products corresponding to the methods described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Techniques and apparatus are provided herein for network synchronization (e.g., by network listening). According to certain aspects synchronizing base stations may transmit synchronization signals which may be received by base stations performing network listening. Duty cycles and/or single frequency network (SFN) transmissions of the synchronization signals may be based on the stratum of the synchronization base station. For BSs performing network listening with different duty cycles, persistent low duty cycles may be signaled as anchor bursts, overlapping across eNBs. In certain aspects, where carrier aggregation (CA) is supported, network listening may be anchor carrier based. For certain aspects, for time division duplexing, the BS may declare a subframe as uplink (UL) for UEs, but the eNB may transmit one or more downlink (DL) signals during the subframe for other BSs to perform network listening and/or the eNB may perform network listening. BSs that perform network listening may receive signaling, via a backhaul connection or over the air, indicating whether a carrier is a legacy carrier type (LCT) or a new carrier type (NCT).

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

Example Wireless Communications Network

Figure 1:
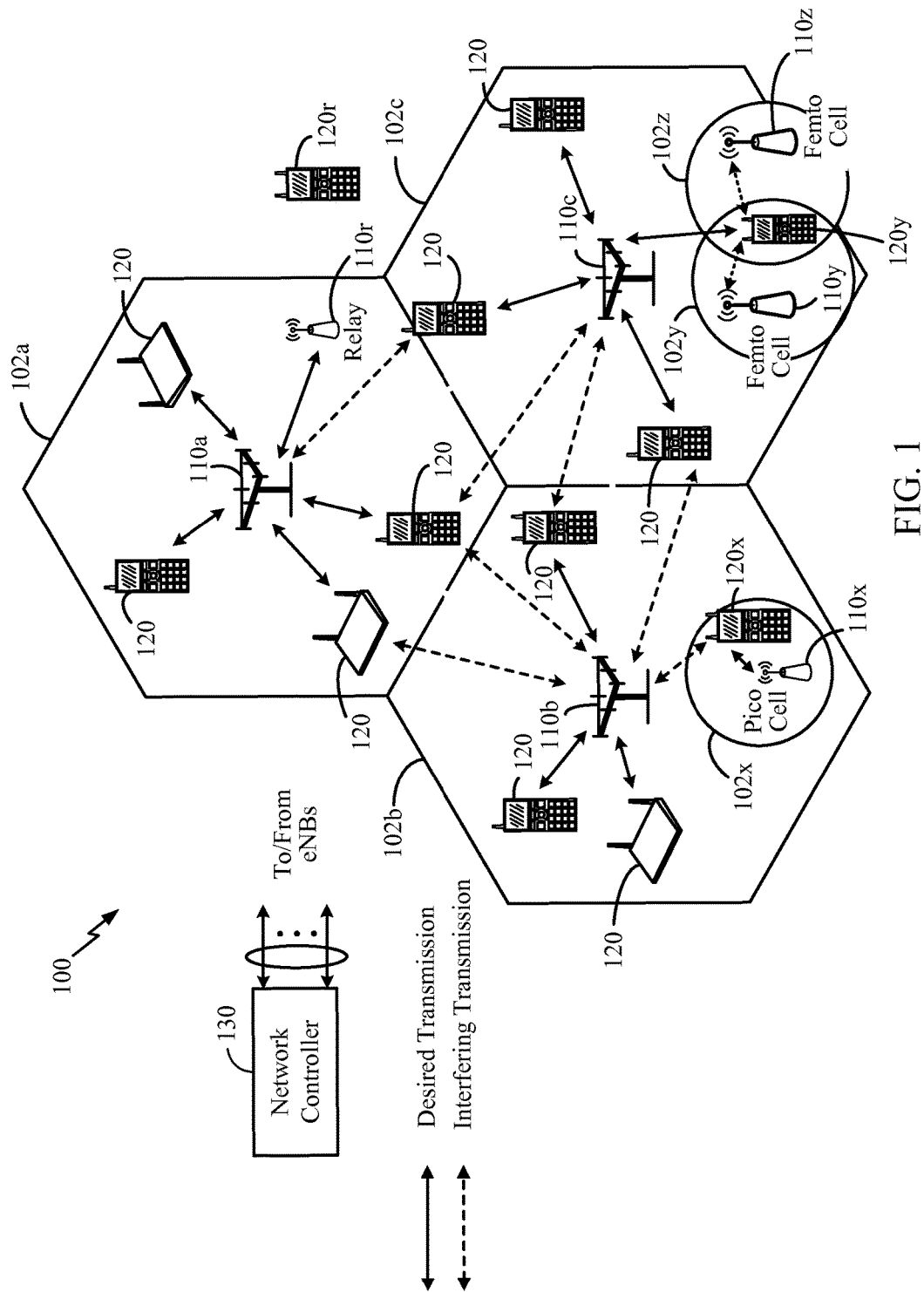
FIG. 1 is a block diagram conceptually illustrating an example of a wireless communications network, in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a small cell, and/or other types of cell. A "small cell" may refer to a cell that is smaller relative than a macro cell. A small cell, for example, may be a pico cell or a femto cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE (e.g. UE relay station) that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 (e.g., 120x, 120y) may be dispersed throughout the wireless network 100, and each UE may be stationary or mobile. A UE may also be referred to as a terminal, a mobile station, a subscriber unit, a station, etc. A UE may be a cellular phone, a smart phone, a personal digital assistant (PDA), a wireless modem, a wireless communication device, a handheld device, a laptop/notebook computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
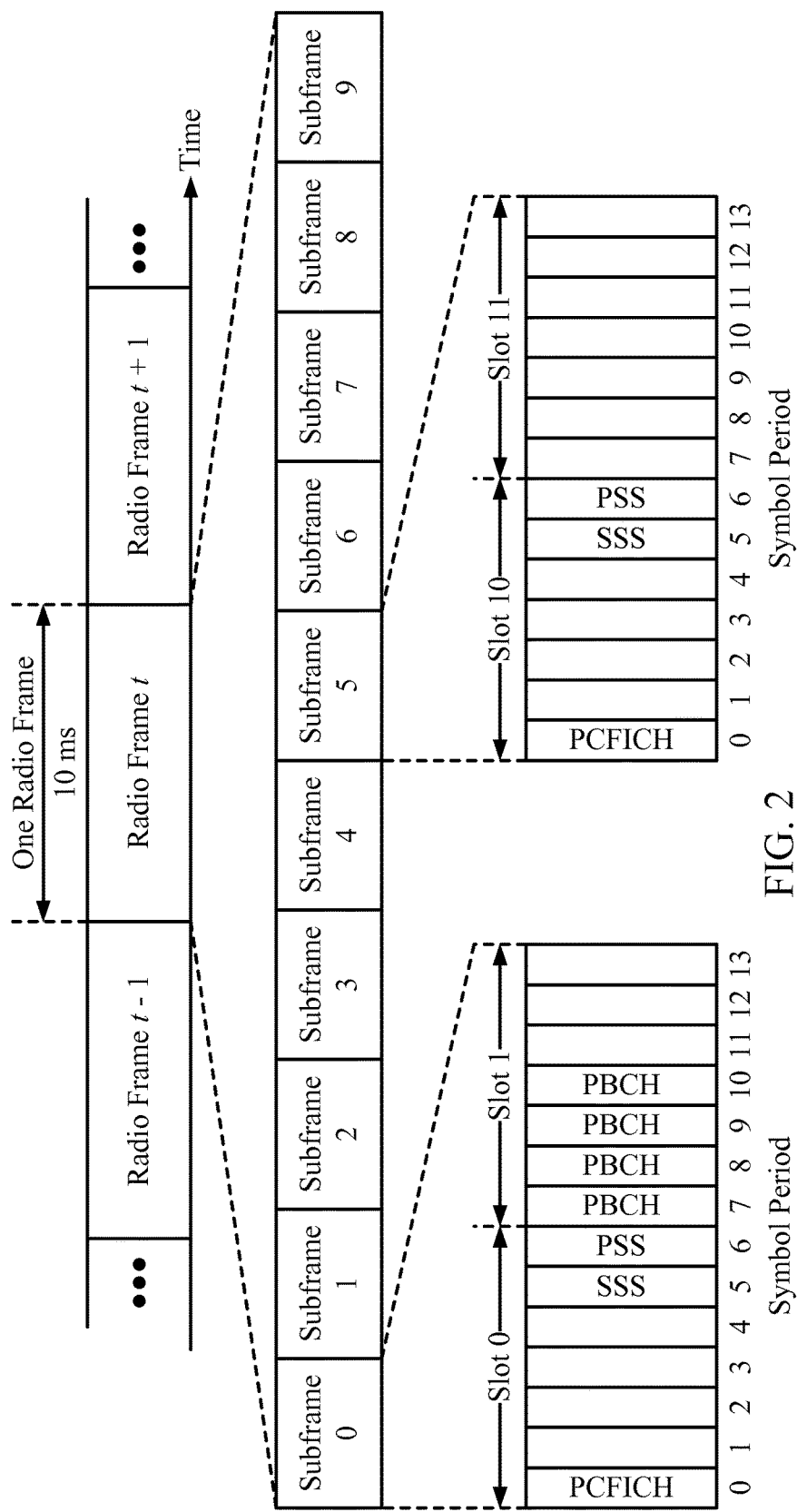
FIG. 2 is a block diagram conceptually illustrating an example of a frame structure in a wireless communications network, in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, for example, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
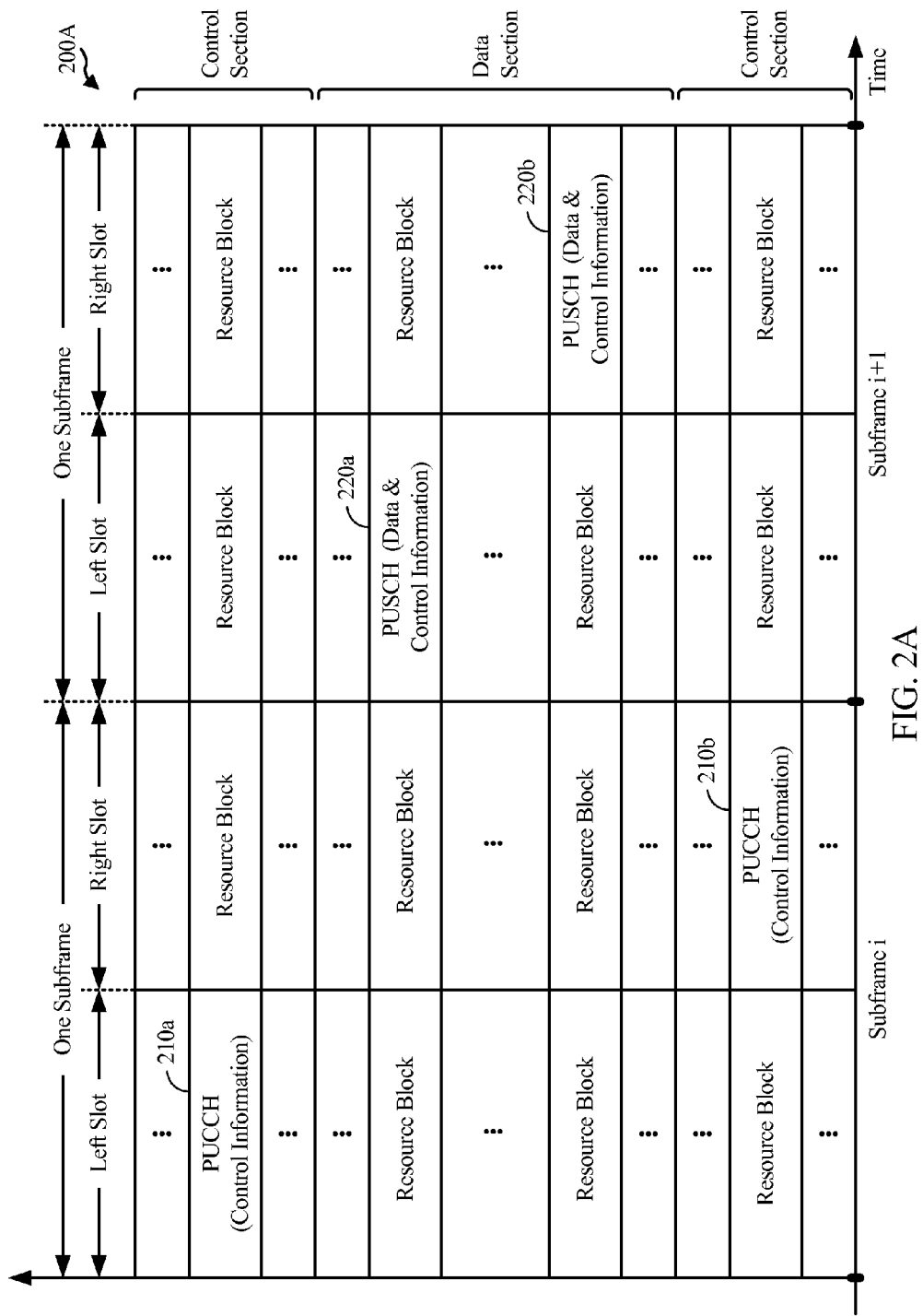
FIG. 2A shows an example format for the uplink in long term evolution (LTE), in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

According to certain aspects, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
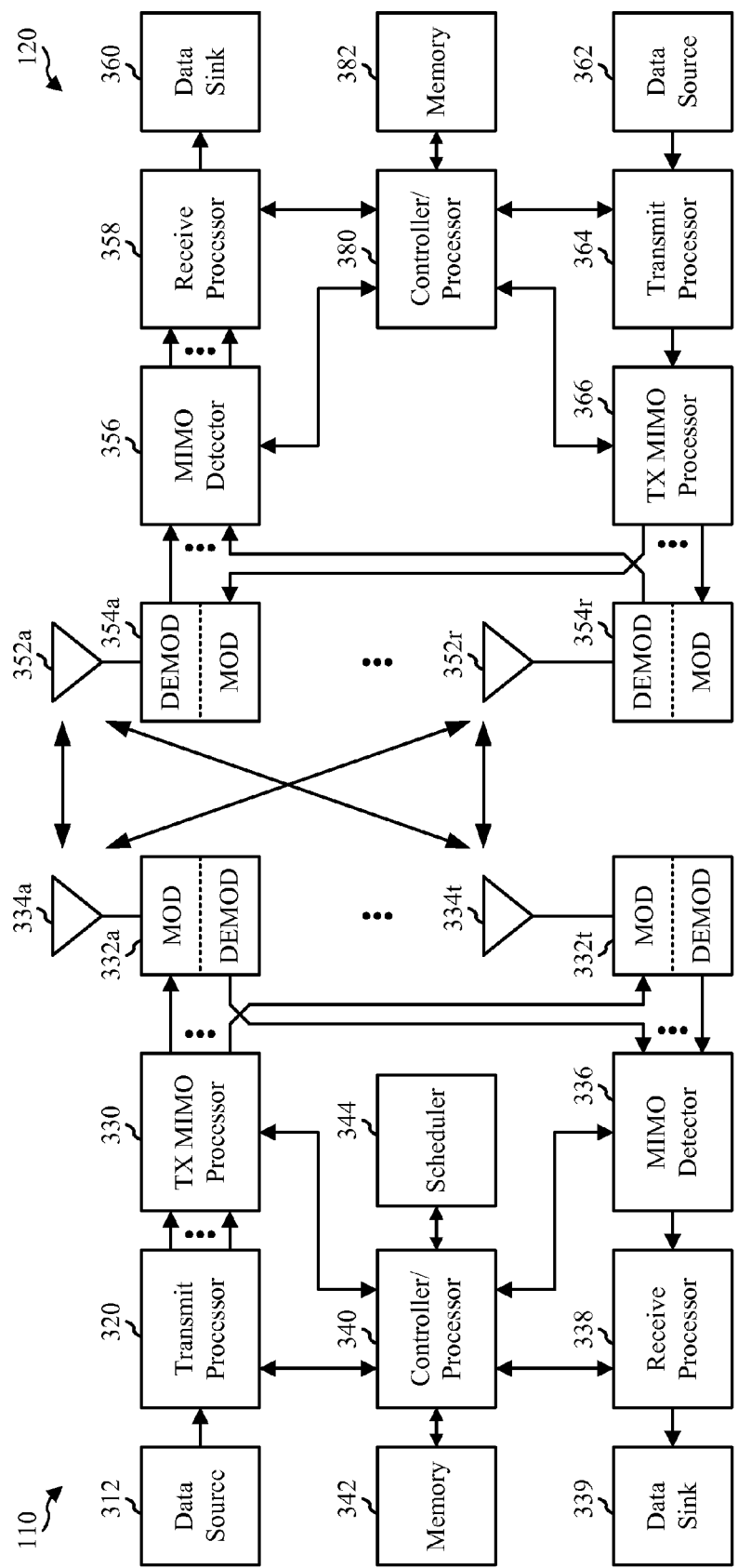
FIG. 3 shows a block diagram conceptually illustrating an example of an evolved Node B (eNB) in communication with a user equipment device (UE) in a wireless communications network, in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, transmit processor 320 and/or other processors and modules at the eNB 110 may perform or direct operations 800-1500 in FIGS. 8-15, for example, and/or other processes for the techniques described herein. The memories 342 and 382 may store data and program codes for the eNB 110 and the UE 120, respectively. A scheduler 344 may schedule UEs for data transmission on the downlink and/or uplink. eNB 110 may transmit static resource partitioning information (SPRI) 390 to UE 120. UE 120 may transmit sounding reference signals (SRS) 392 to eNB 110.

According to certain aspects, UE-specific demodulation reference signals (DMRSs) may be used for downlink channel estimation for coherent demodulation of the PDSCH. According to certain aspects, to provide good channel estimation for the PDSCH, each resource block RB carrying the PDSCH may include sufficient DMRS for good channel estimation within the RB.

Figure 4:
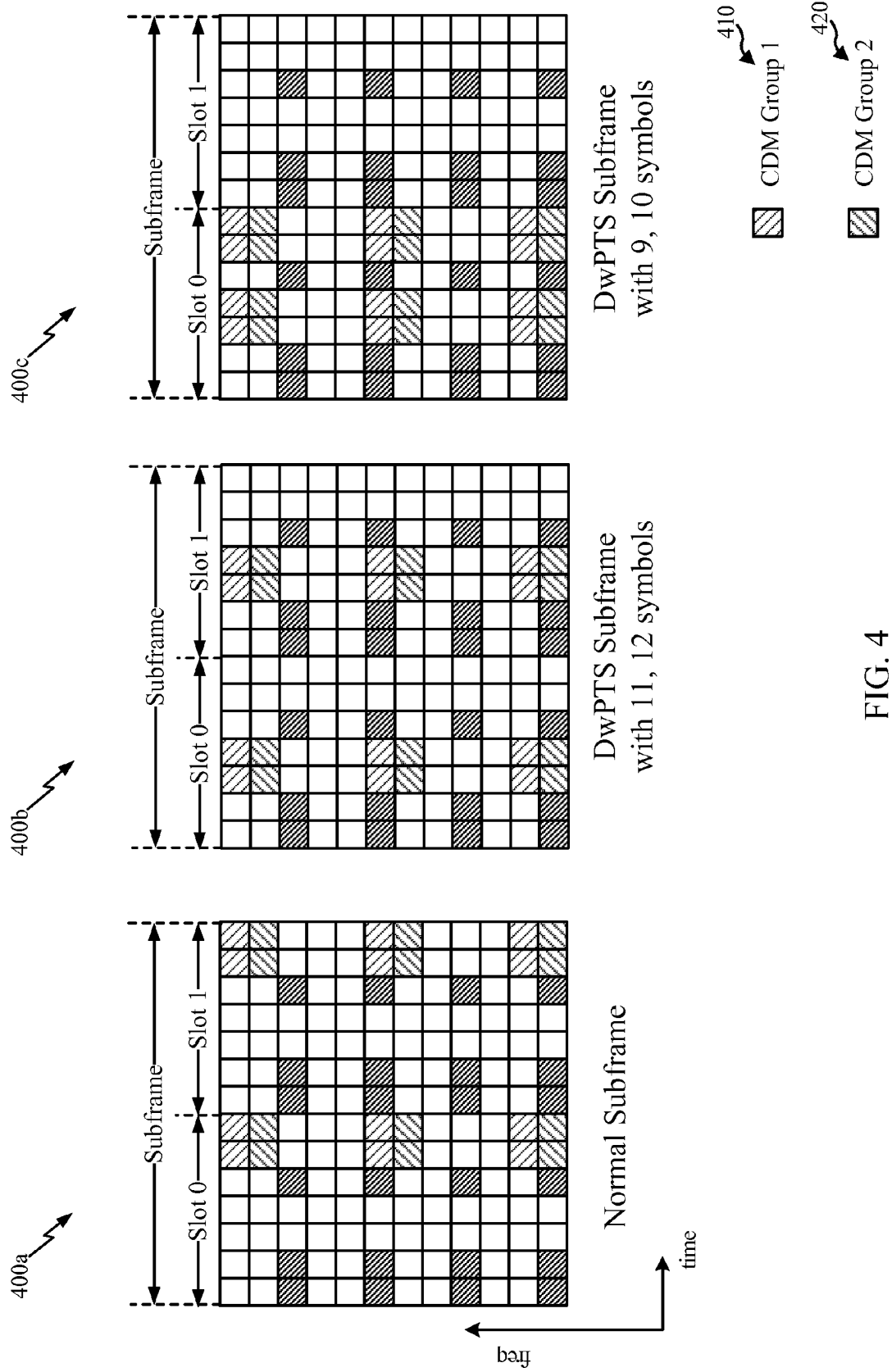
FIG. 4 illustrates example demodulated reference signal (DMRS) patterns for normal cyclic prefix (CP), in accordance with certain aspects of the present disclosure.

FIG. 4 illustrates example DMRS patterns 400a-c, as defined in Rel-10 for the normal cyclic prefix case, which may be used in accordance with certain aspects of the present disclosure.

As illustrated, resource elements (REs) 410 and 420 are allocated for DMRS transmissions. In the illustrated example, REs 410 are used for CDM Group 1 and REs 420 are used for CDM Group 2. As shown in FIG. 4, the DMRS occupies the sixth and seventh symbols of each of the first and second slots of the subframe.

DMRS pattern 400a shows a DMRS pattern for a normal subframe. As used herein, the term normal subframe is a relative term, referring to a subframe that does not have a Downlink Pilot Time Slot (DwPTS), a special downlink timeslot that typically occurs in certain subframes (e.g., the $2^{nd}$ or $7^{th}$ subframe in a radio frame, depending on a subframe configuration) when LTE is operated in Time Division Duplex (TDD). The length of DwPTS subframes is variable, to allow for different DownLink—UpLink switching periods to be configured.

DMRS pattern 400b shows an example DMRS pattern for a DwPTS subframe with 11 or 12 symbols. As shown in this example, the DMRS occupies the third and fourth symbols of each of the first and second slots of the subframe. DMRS pattern 400c shows a DMRS pattern for a DwPTS subframe with 9, 10 symbols. As shown in this example, the DMRS occupies the third, fourth, sixth and seventh symbols of the, first slot of the subframe.

In legacy systems (e.g., Rel-8/9/10), the Primary Synchronization Signal (PSS) and the Secondary Synchronization Signal (SSS) are generally transmitted in the center six RBs only in subframes 0 and 5 (e.g., as shown in FIG. 2). The Primary Broadcast Channel (PBCH) is also generally transmitted in the center six RBs but only in subframe 0.

Figure 5:
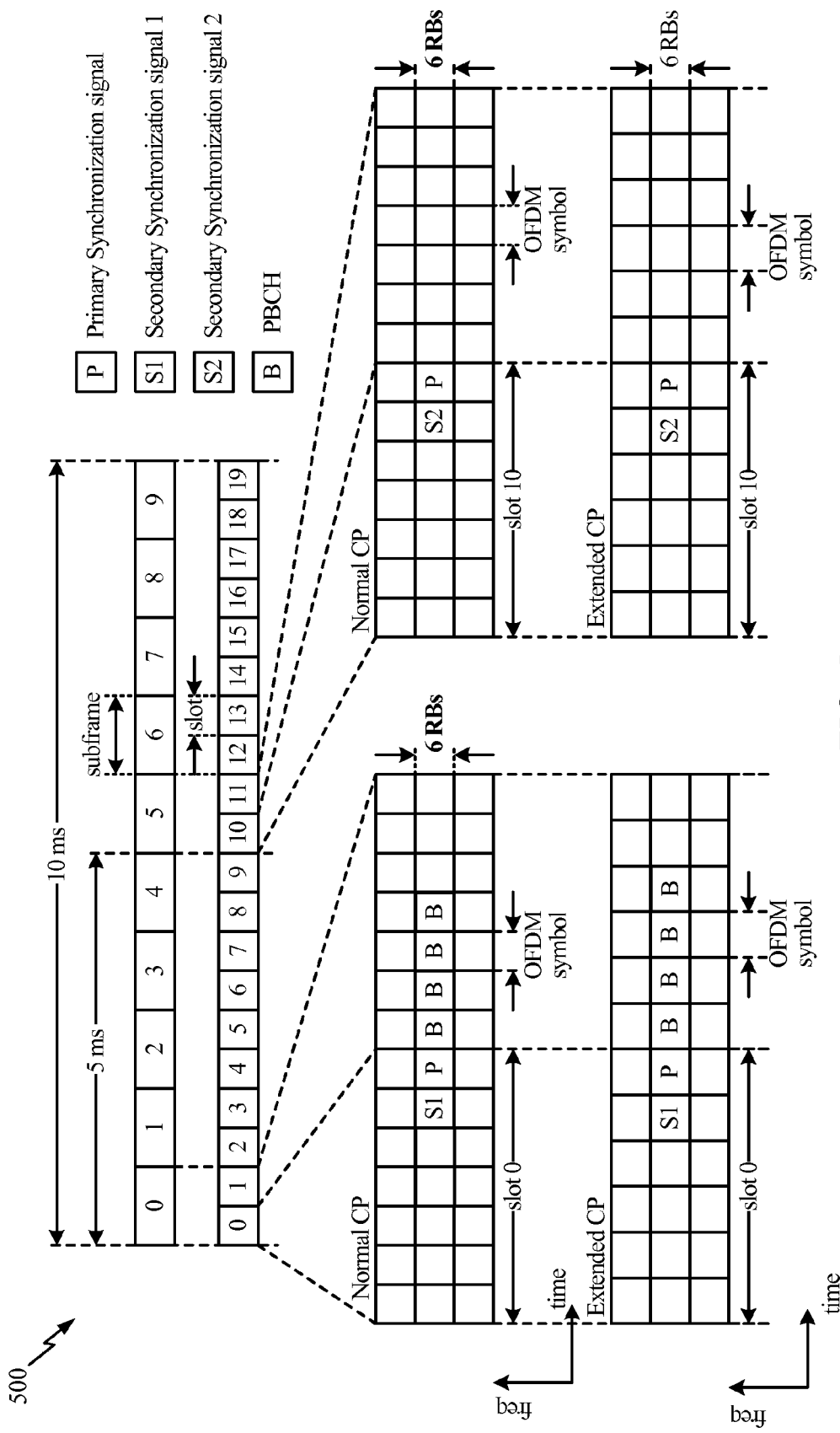
FIG. 5 illustrates resource configuration for primary synchronization signal (PSS), secondary synchronization signal (SSS), and physical broadcast channel (PBCH) in an LTE frame, in accordance with certain aspects of the present disclosure.

FIG. 5 illustrates an example resource configuration 500 for PSS, SSS and PBCH in an LTE frame, in accordance with certain aspects of the present disclosure. As shown in FIG. 5, an LTE frame 10 ms long is typically divided into ten subframes each 1 ms long. Each subframe may further be divided into two slots, slot 0 and slot 1. As shown, PSS and SSS are typically transmitted every 5 ms in subframes 0 and 5. The PSS and SSS are transmitted back to back in the last two symbols of the first slot in the subframes 0 and 5. Typically, SSS is transmitted before PSS.

According to certain aspects of the present disclosure, as shown in FIG. 5, in order to differentiate the 10 ms boundary, the two SSS signals, SSS1 (e.g., subframe 0) and SSS2 (e.g., subframe 5) may have different arrangements. The PSS arrangement, however, may be fixed. PBCH is transmitted every 10 ms in the first four symbols of the second slot of subframe 0. According to certain aspects, the above defined PSS/SSS/PBCH configuration is used for frequency division duplex (FDD) transmission.

According to certain aspects, for TDD transmissions, the SSS may be transmitted in the last symbol of subframes 0 and 5, and the PSS may be transmitted in the third symbol of subframes 1 and 6.

Example Methods and Apparatus for Network Synchronization

Techniques and apparatus are provided herein for network synchronization (e.g., by network listening). According to certain aspects synchronizing base stations may transmit synchronization signals which may be received by base stations performing network listening. Duty cycles and/or single frequency network (SFN) transmissions of the synchronization signals may be based on the stratum of the synchronization BS. For BSs performing network listening with different duty cycles, persistent low duty cycles may be signaled as anchor bursts, overlapping across e NodeBs (eNBs). In certain aspects, where carrier aggregation (CA) is supported, network listening may be anchor carrier based. For certain aspects, for time division duplexing (TDD), the BS may declare a subframe as UL for UEs, but the eNB may transmit DL signal during the subframe for other BSs to perform network listening and/or the eNB may itself perform network listening. BSs performing network listening may receive signaling, via a backhaul connection or over the air, indicating whether a carrier is a legacy carrier type (LCT) or a new carrier type (NCT), and perform the listening based thereon.

Network synchronization is desirable for wireless communications. Various network synchronization techniques have been identified for TDD BSs, for example, Home eNBs (HeNBs).

One technique for TDD BS (e.g., HeNB) network synchronization involves global positioning system (GPS). For this technique, if the BS includes a GPS receiver for acquiring GPS synchronization signals, then GPS may provide accurate synchronization accuracy (e.g., on the order of 100 ns). However, GPS receivers may not always work in all scenarios (e.g., indoors). Additionally, GPS receivers may increase costs to the small cell.

Another technique for network synchronization, from IEEE 1588 v2, may provide sub-microsecond level accuracy under good backhaul conditions (e.g., operator controlled fiber/Ethernet). However, such good backhaul conditions may not always be possible. In particular, backhauls over cable and digital subscriber line (DSL) modems may experience significant jitter and delay variations. Upstream packet delay $\delta_1$ may not equal the downstream delay $\delta_2$, which may produce an error of $(\delta_1-\delta_2)/2$. This error may be up to many milliseconds. Thus, the IEEE 1588 v2 technique usefulness may be limited for the application of TDD-LTE synchronization.

A third technique for network synchronization involves network listening. Network listening can be used in scenarios, for example, where GPS and IEEE 1588 v2 are not viable techniques. For this reason, network listening may be an important synchronization scheme for TDD-LTE BSs (e.g., HeNBs) in those scenarios where other techniques are not applicable.

Figure 6A:
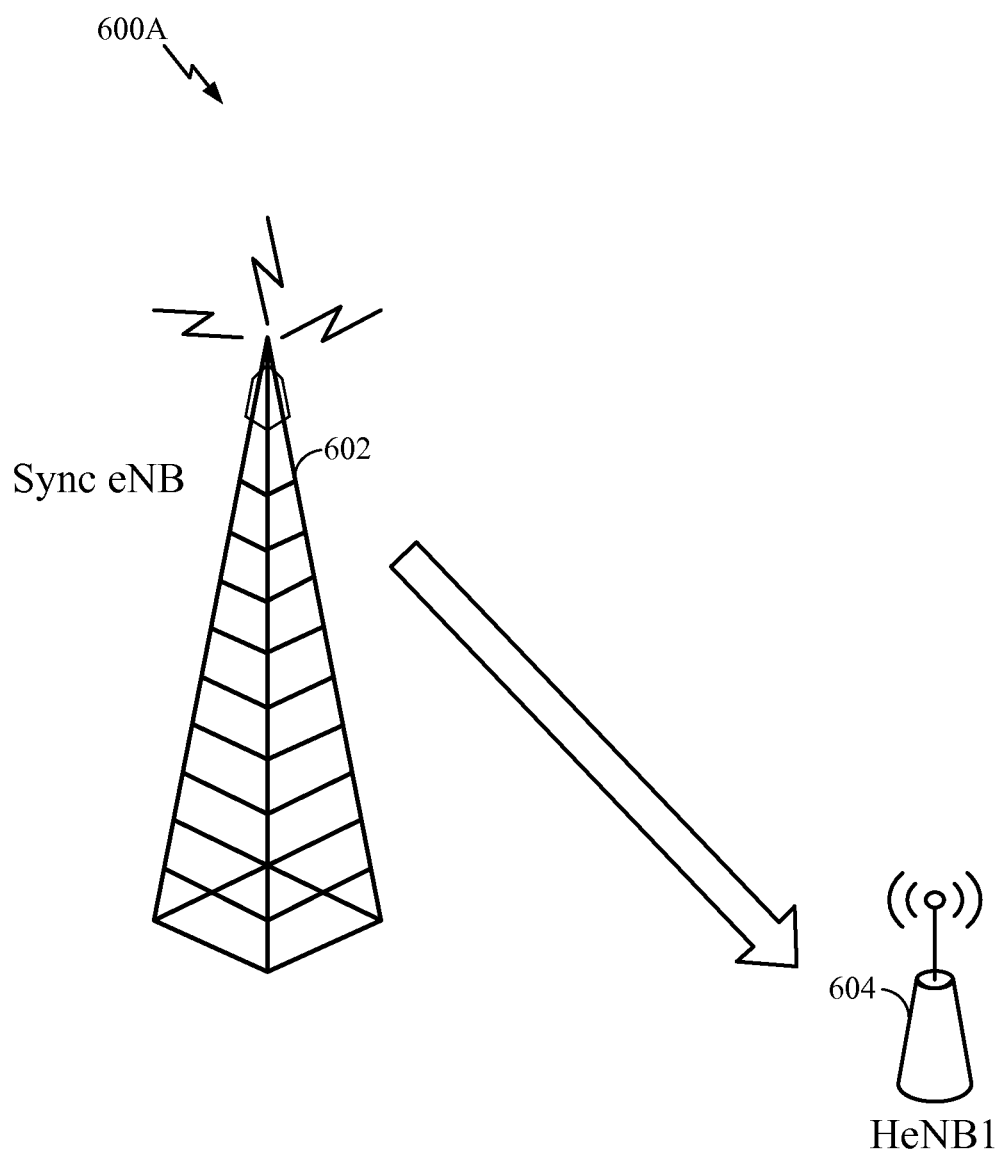
FIGS. 6A-6B illustrate example network synchronization using network listening, in accordance with certain aspects of the present disclosure.
Figure 6B:
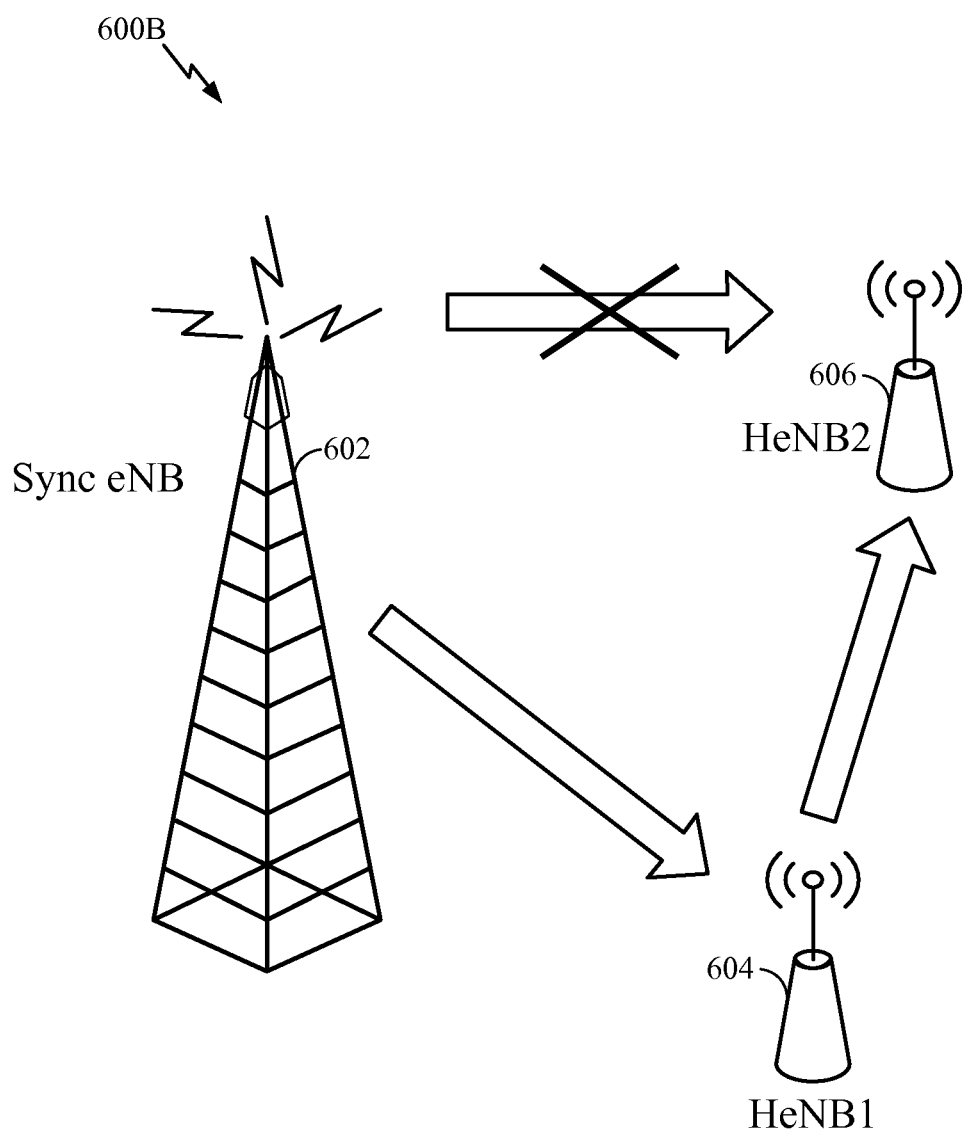

FIGS. 6A-6B illustrate example network synchronization using network listening, in accordance with certain aspects of the present disclosure. As illustrated in FIG. 6A, using network listening, a BS (e.g., HeNB1 604) may derive its timing from a primary base station such as a synchronized eNB (e.g., Sync eNB 602). As illustrated in FIG. 6B, a BS (e.g., HeNB2 606) may derive its timing from a secondary base station such as another synchronized HeNB (e.g., HeNB1 604). In aspects, Sync eNB 602 may include a BS that has acquired synchronization with the network from a primary source.

According to certain aspects, both single hop and multiple hop synchronization may be supported (e.g., using stratum). As shown in FIG. 6A, for single-hop synchronization 600A, the HeNB1 604 may utilize a synchronization or reference signal from Sync eNB 602 to derive its timing. As shown in FIG. 6B, for multi-hop synchronization 600B, when HeNB2 606 may not acquire synchronization from a primary synchronization source, for example, a Sync eNB 602 (or an HeNB with global navigation satellite system (GNSS) synchronization), then multiple hops may be supported via the concept of synchronization stratum. For example, as illustrated in FIG. 6B, the HeNB2 606 may derive its timing from HeNB1 604, which in turn derived its timing from Sync eNB 602.

According to certain aspects, the synchronization stratum of a particular BS may be defined as the smallest number of hops between the BS (e.g., HeNB1 604 or HeNB2 606) and the GPS source (e.g., Sync eNB 602). The synchronization stratum of a particular BS may be one greater than its donor BS (e.g., the (H)eNB that it is tracking). For example, in the example illustrated in FIG. 6B, Sync eNB 602 has stratum 0, HeNB1 604 has stratum 1, and HeNB2 has stratum 2.

In certain systems (e.g., Release 12), various deployment scenarios include both outdoor and indoor deployment deployments with and without macro cells in the same carrier frequency. FIGS. 7A-7D illustrate example small cell deployment scenarios 700A-700D, respectively, in accordance with certain aspects of the present disclosure.

Figure 7A:
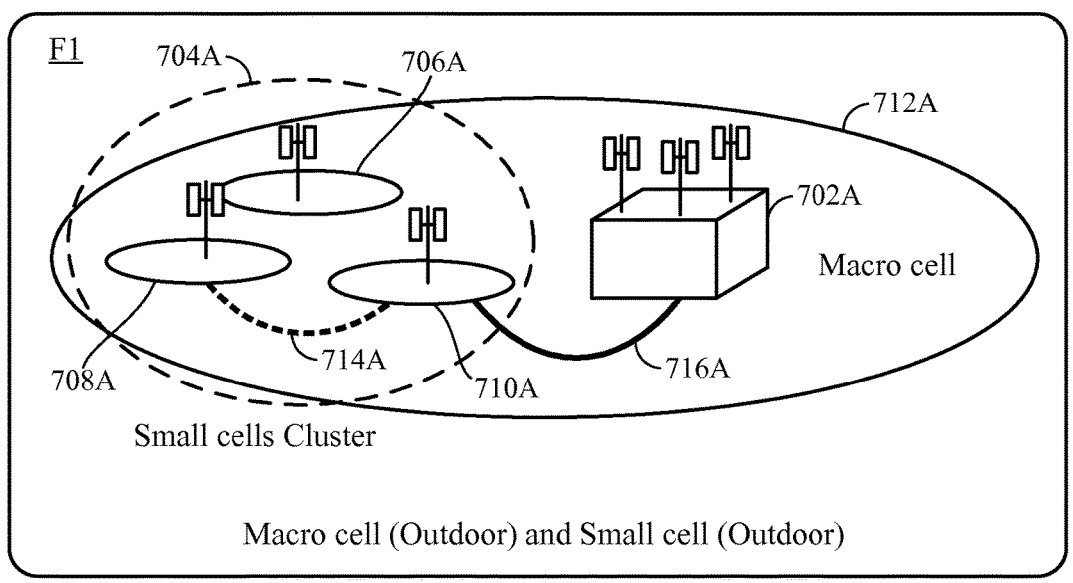
FIGS. 7A-7D illustrate example small cell deployment scenarios, in accordance with certain aspects of the present disclosure.

FIG. 7A illustrates an example small cell deployment scenario 700A with a macro cell 702A (e.g., for outdoor deployment) and small cell cluster 704A of small cells 706A, 708A, and 710A (e.g., for outdoor deployment). As shown in FIG. 7A, the small cell cluster 704A may be located within the coverage area 712A of the macro cell 702A. Two of the small cells within the small cluster, for example, small cells 708A and 710A may have a backhaul link 714A. In aspects, there may be a backhaul link between the small cells and the Macro cell, for example, the backhaul link 716A between small cell 710A and macro cell 702A.

Figure 7B:
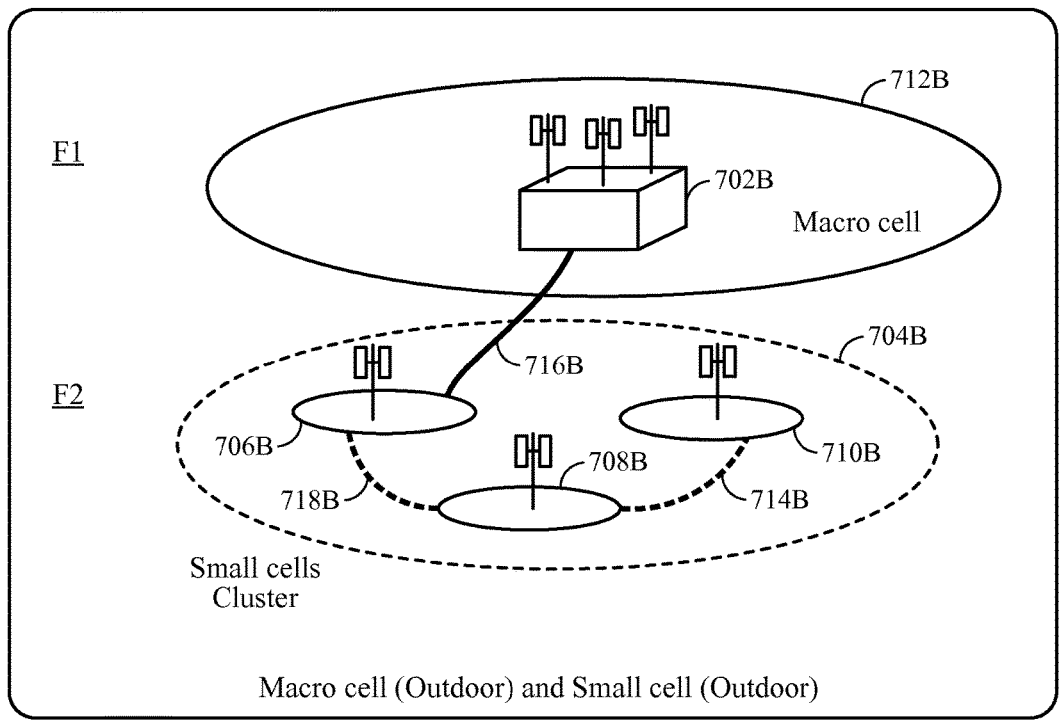
Figure 7C:
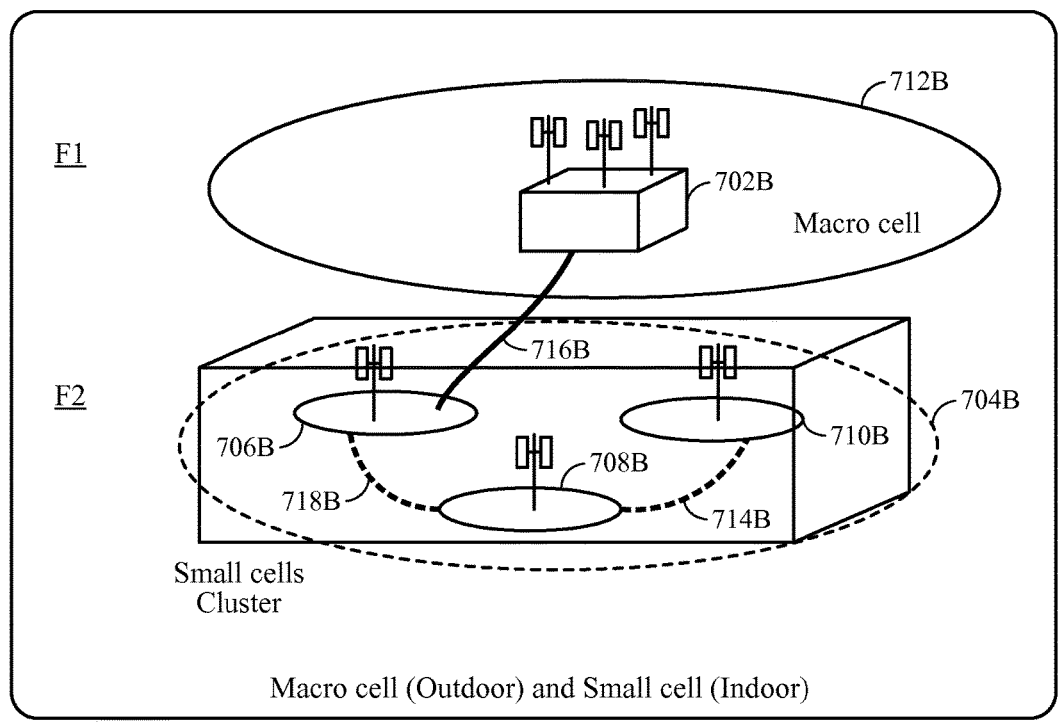
Figure 7D:
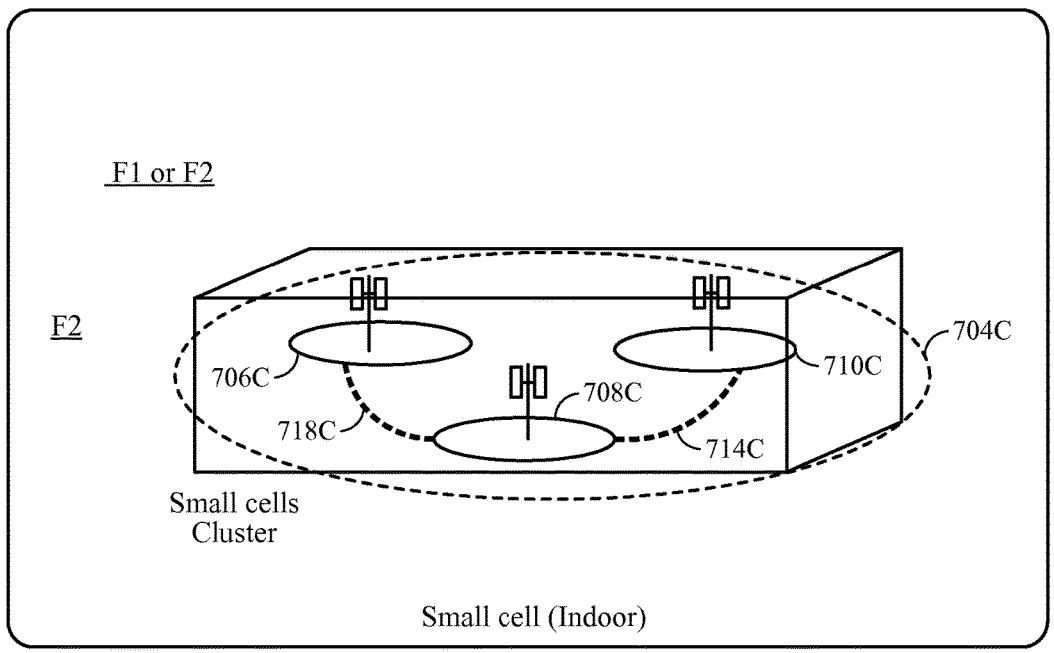

FIG. 7B illustrates an example small cell deployment scenario 700B with a Macro cell 702B (e.g., for outdoor deployment) and small cell cluster 704B of small cells 706B, 708B, and 710B (e.g., for outdoor deployment). As shown in FIG. 7B, the small cell cluster 704B may be located beyond the coverage area 712B of the macro cell 702B. Small cells in the small cell cluster 704B, for example, between small cells 708B and 710B and between small cells 708B and 706B, may have a backhaul link 714B and 718B. In aspects, there may also be a backhaul link between the small cells and the macro cell, for example, the backhaul link 716B between small cell 706B and macro cell 702B. According to certain aspects, the small cell cluster 704B may for indoor deployment, as illustrated in FIGS. 7C and 7D.

For TDD deployment of small cells, synchronization requirements and techniques may mitigate the uplink (UL)/ downlink (DL) eNB-to-eNB and UE-to-UE interference. Although enhanced interference management and traffic adaptation (eIMTA) systems may allow possible different transmission directions across different cells, the time synchronization is still desirable for subframes to have aligned transmission directions.

For frequency division duplexing (FDD) deployment of small cells, synchronization is desirable for advanced features such as enhanced inter-cell interference coordination (FeICIC), coordinated multipoint transmission (CoMP), NAIC, etc.

According to certain aspects, for small cells, network synchronization techniques described above may be applied for both FDD and TDD.

According to certain aspects, different transmit (Tx) duty cycles may be used for BSs having different synchronization stratum. In aspects, transmissions may be staggered and/or orthogonal across different stratums. For example, BS having stratum 0 may transmit in subframes at 0, 100 ms, 200 ms, and 300 ms, etc., while BS with stratum 1 may occupy subframes at 50 ms, 250 ms, and 450 ms, etc.

In aspects, one or more BSs associated with a lower stratum may transmit more frequently, with some overlapping time between transmissions from one or more BSs associated with a higher stratum. For example, BS with stratum 0 may transmit during subframes at 0, 100 ms, 200 ms, and 300 ms, while BS with stratum 1 may transmit during subframes at 0 ms, 300 ms, and 600 ms, etc.

According to certain aspects, network listening may be anchor carrier based. In aspects, if carrier aggregation (CA) is supported, it may be sufficient to perform network listening on a single carrier (e.g., an anchor carrier), where cell-specific reference signal (CRS) or other DL signals may be monitored for network listening. However, if a repeater is deployed in a carrier, the carrier should not be used as the anchor carrier. In aspects, the BS may indicate through backhaul exchange or over-the-air (OTA) whether or not the carrier should be used as an anchor carrier (e.g., by indicating whether a repeater is deployed for the carrier).

According to certain aspects, persistent low duty cycle signals may be transmitted (e.g., as anchor bursts). In aspects, low duty cycle signals may be used as discovery signals for network listening with different duty cycles, where in some time instances, the signals overlap across eNBs. In aspects, low duty cycle occasions may be introduced (e.g., a new signal or reused discovery signal) that are transmitted periodically—even for eNB dormancy mode. These signals may not be primary synchronization signals (PSS), secondary synchronization signal (SSS), or CRS—as in a dormant mode—because PSS, SSS, and CRS are monitored by user equipment (UEs) and the eNB may not be able to turn the signals off to listen to other eNBs. In aspects, power boost may be applied for the anchor bursts to reach far away nodes.

According to certain aspects, local single frequency network (SFN) transmission may be performed with one or more BSs of the same stratum (e.g., stratum one small cells with SFN). In aspects, the SFN operation may also be subframe dependent or location dependent. In aspects, the signal is a new signal.

According to certain aspects, for TDD, the eNB may declare a subframe as an UL subframe for UEs. In aspects, some eNBs may transmit DL signals during the subframe for other cells to perform network listening and/or the eNB may itself perform network listening during the subframe. In aspects, the eNB should not schedule the UL subframe for random access channel (RACH) or any other uplink UL transmissions.

NCT may transmit CRS only on port 0 from subframes 0 and 5. According to certain aspects, a backhaul exchange may indicate whether NCT and/or LCT is used to perform network listening.

According to certain aspects, different cells may have different TDD configurations and the traditional technique of using MBSFN may have issues. One solution for network listening is to allow some DL transmission of the synchronization signals on a subframe where it is declared as U subframe (e.g., an uplink subframe) to the UE. Since the subframe of a serving cell is declared as U to the UEs, the UE will not look for DL signals from this cell. In these subframes, some small cells may transmit signals for other small cells to synchronize, while other small cells may turn off their DL transmission to perform network listening.

According to certain aspects, a backhaul or over the air exchange may be defined to indicate legacy carrier type (LCT) or new carrier type (NCT) to perform network listening. This is desirable because NCT may only transmit CRS on port 0 from subframes 0 and 5. In Rel-12 and beyond, for example, a new carrier type (NCT), not necessarily backward compatible, may be introduced. With NCT, the presence of CRS may be only in a subset of subframes (e.g., every 5 subframes), may be limited to only one antenna port, and may be narrowband. This may help reduce DL overhead and provide energy savings for eNB. A carrier of NCT may be a standalone or part of carrier aggregation. In some cases, NCT may not have the legacy control region, at least in some subframes (if not in all subframes). NCT may completely rely on an enhanced Physical Downlink Control Channel (ePDCCH) (e.g., transmitted using resources traditionally used for Physical Downlink Shared Channel (PDSCH)), and potentially enhanced Physical Control Format Indicator Channel (ePCFICH) and/or enhanced PHICH (ePHICH) for the control signaling, or control from another carrier. In some embodiments, NCT may employ resources which are originally intended for a first purpose for a second purpose. In some embodiments, NCT may employ resources which are traditionally employed for a first purpose for a second purpose.

According to certain aspects, in the context of small cells, different cells may have different TDD configurations for eIMTA. In certain embodiments, across all TDD configurations, there are subframes that do not change transmission directions, such as subframes 0/1/5/6. Small cells may rely on these fixed DL subframes, or a subset of these subframes, for network listening. Small cells may perform out of band listening, but only listening on the fixed subframes. Alternatively, small cells may use low duty cycle listening mode at the fixed subframes by turning off their Tx. CRS, PSS, or SSS may be used in this context. The eNB may have a better oscillator (e.g., with smaller drift). Therefore, wake up time may be sparser than UE tracking.

In certain embodiments, small cells may use another non-fixed subframe, but inform the UE it is multi-broadcast SFN (MBSFN). In MBSFN, CRS is transmitted from the first symbol, but some eNB may transmit DL signals in the remaining part of subframe for network listening. This may be for both FDD and TDD. The downlink signal may be either CRS or another signal used for network listening. At a lower duty cycle, eNB may search for PSS/SSS during anchor subframes (e.g., subframes that do not change transmission direction) to find the neighbor cells.

According to certain aspects, different small cells may go to dormant at different times to save power and reduce interference. In NCT, CRS is transmitted only on SF0 and SF5 with port zero. When a small cell performs network listening, the synchronized cells may be off.

For coordinated cell dormancy synchronized cells may have restricted dormancy. Based on a backhaul or over the air information exchange, the synchronized small cell may have restricted dormancy operation. The small cell may transmit DL signal for synchronization of other small cells that perform network listening. Alternatively, restricted network listening time for synchronizing cells may be employed. The transmission time of the synchronized small cells may be exchanged in the backhaul or over the air, such that the synchronizing cells may perform network listening only at these transmission times.

According to certain aspects, transmissions may be staggered according to synchronization stratum. Small cells associated with different dormancy times may have more opportunities to listen to small cells with lower stratum.

Table 1 illustrates various uplink and downlink configurations and the corresponding downlink-to-uplink switch-point periodicity, where U indicates uplink transmission direction, D indicates downlink transmission direction, and S indicates a special subframe.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 8:
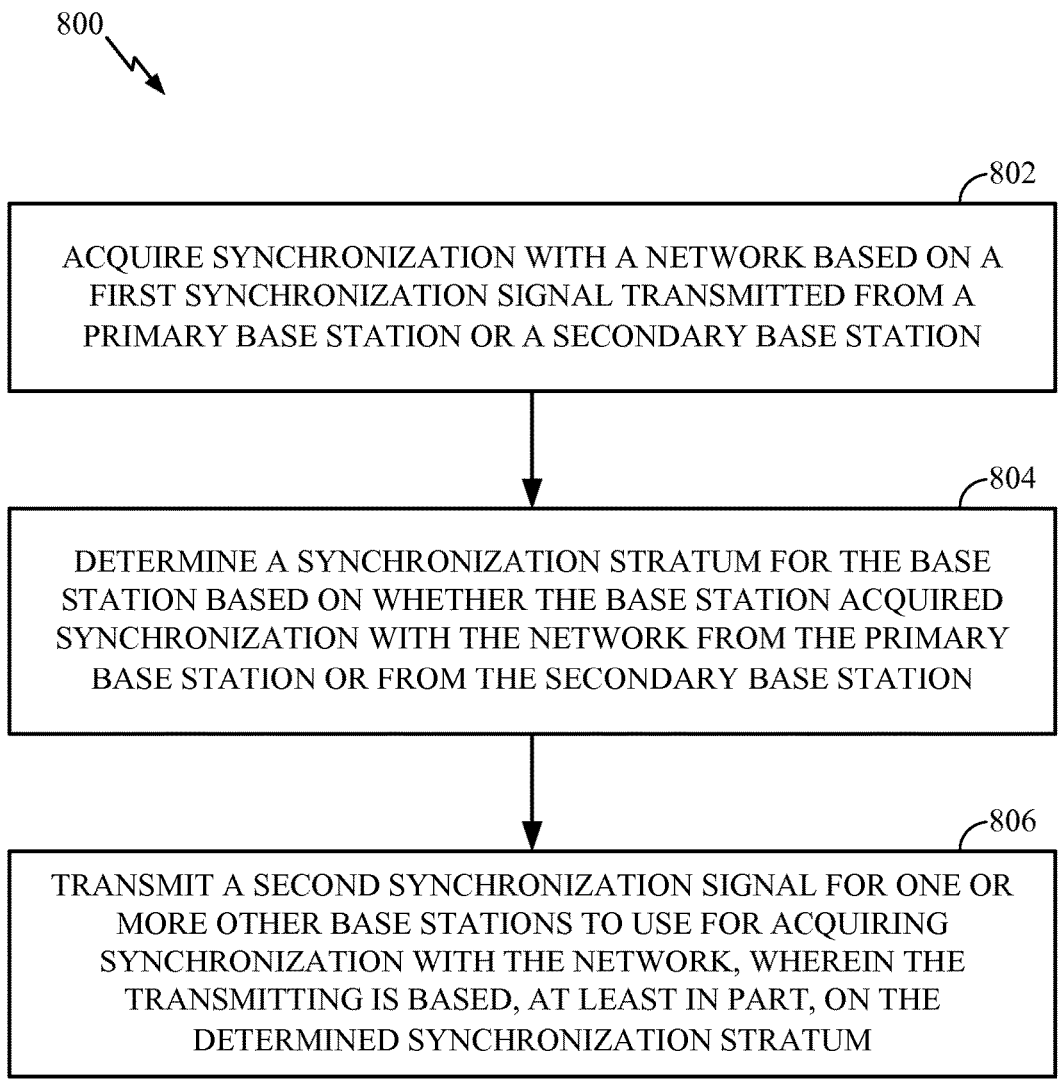
FIG. 8 illustrates example operations for wireless communications that may be performed by a base station (BS), in accordance with certain aspects of the present disclosure.
Figure 9:
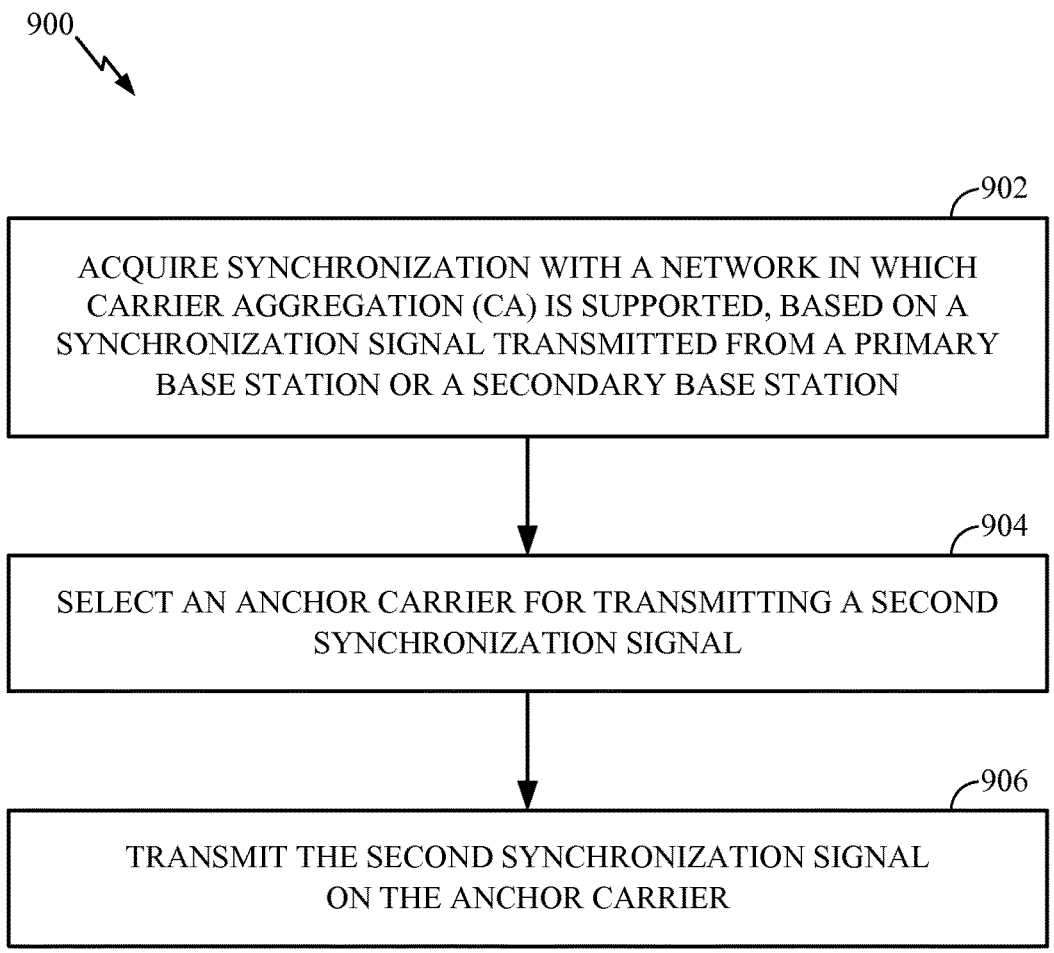
FIG. 9 illustrates example operations for wireless communications that may be performed by a BS, in accordance with certain aspects of the present disclosure.
Figure 10:
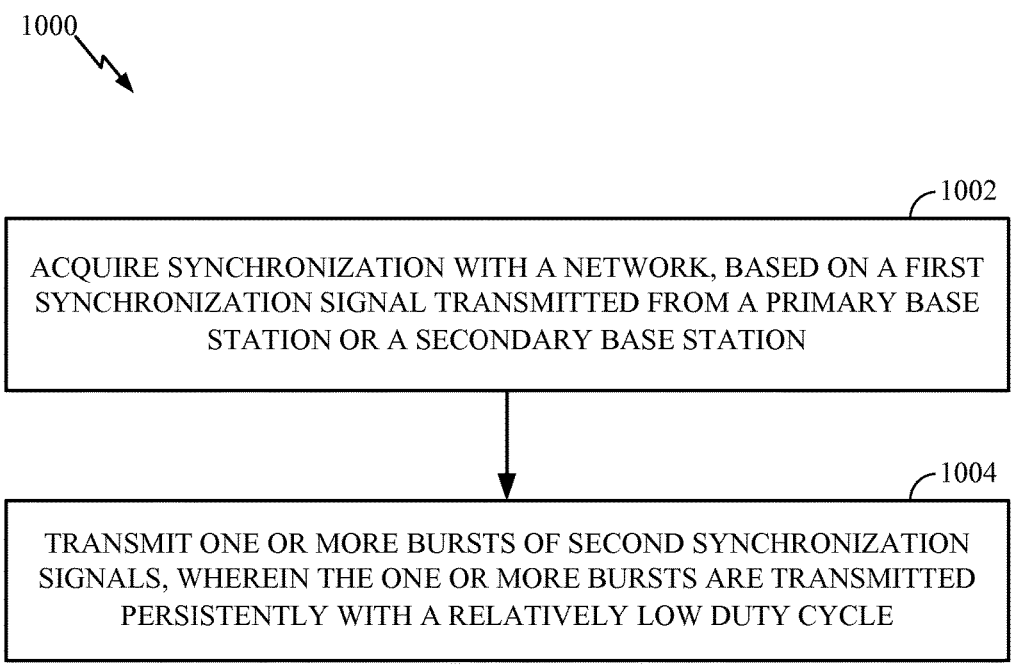
FIG. 10 illustrates example operations for wireless communications that may be performed by a BS, in accordance with certain aspects of the present disclosure.

FIGS. 8-10 illustrate example operations that may be performed, for example, by a BS, such as a synchronizing BS, for transmitting synchronization signals to network listening BSs.

FIG. 8 illustrates example operations 800 for wireless communications. The operations 800 may be performed, for example, by a BS (e.g., HeNB, Pico BS, Femto BS, or relay BS). The operations 800 may begin, at 802, by acquiring synchronization with a network based on a first synchronization signal transmitted from a primary BS or a secondary BS.

At 804, the BS may determine a synchronization stratum for the BS based on whether the BS acquired synchronization with the network from the primary BS or from the secondary BS. In aspects, the synchronization stratum may be determined based on a number of hops between the BS and the primary BS. The synchronization stratum may be proportional to the number of hops. A BS with a lower synchronization stratum may transmit synchronization signals more frequently than a BS with higher synchronization stratum. The BSs with different synchronization stratums may transmit at least partially overlapping synchronization signals.

At 806, the BS may transmit a second synchronization signal for one or more other BSs (e.g., a third BS, or a group of BSs that does not include the first and second BSs) to use for acquiring synchronization with the network, wherein the transmitting is based, at least in part on the determined synchronization stratum. For example, the BS may transmit PSS, SSS, CRS, a new cell discovery signal, or a low duty cycle signal for network listening. In aspects, the BS may determine a duty cycle for transmitting the synchronization signal based, at least in part, on the determined synchronization stratum. In aspects, BSs with different synchronization stratums may transmit non-overlapping synchronization signals. In aspects, the BS may perform SFN transmission (e.g., subframe dependent or location dependent) with one or more BSs of the same stratum. In aspects, acquiring synchronization with a network based on a first synchronization signal transmitted from a primary BS or a secondary BS includes signaling to one or more user equipments (UEs) that a subframe is an uplink subframe and listening for the first synchronization signal transmitted by another BS during the subframe for acquiring synchronization with a network. Additionally or alternatively, transmitting a second synchronization signal for one or more other BSs to use for acquiring synchronization with the network includes signaling to one or more UEs that a subframe is an uplink subframe and transmitting the second synchronization signal for other BSs to listen for during the subframe.

FIG. 9 illustrates example operations 900 for wireless communications. The operations 900 may be performed, for example, by a BS (e.g., HeNB, Pico BS, Femto BS, or relay BS). The operations 900 may begin, at 902, by acquiring synchronization with a network in which carrier aggregation (CA) is supported, based on a first synchronization signal transmitted from a primary BS or a secondary BS.

At 904, the BS may select an anchor carrier for transmitting a second synchronization signal. In aspects, the anchor carrier may be a carrier where CRS or some other downlink (DL) signals are monitored. In aspects, the selected anchor carrier may be a carrier on which a repeater is not deployed. In aspects, the BS may determine a repeater is deployed on a carrier based on a backhaul or OTA exchange with another BS.

At 906, the BS may transmit the second synchronization signal on the anchor carrier.

FIG. 10 illustrates example operations 1000 for wireless communications. The operations 1000 may be performed, for example, by a BS (e.g., HeNB, Pico BS, Femto BS, or relay BS). The operations 1000 may begin, at 1002, by acquiring synchronization with a network, based on a first synchronization signal transmitted from a primary BS or a secondary BS.

At 1004, the BS may transmit one or more bursts of second synchronization signals (e.g., even when the BS is in a dormant mode), wherein the one or more bursts are transmitted persistently with a relatively low duty cycle. In aspects, the one or more bursts of synchronization signals may at least partially overlap with one or more bursts of synchronization signals from a different BS. In aspects, the one or more bursts of synchronization signals may include one or more signals that are intended for at least one of a UE or another BS. In aspects, the one or more bursts of synchronization signals do not include a synchronization signal for a UE served by the BS.

In aspects, the BS may boost transmission power for transmitting the one or more bursts of synchronization signals, relative to transmission power for other signals.

FIGS. 11-15 illustrate example operations that may be performed, for example, by a BS (e.g., a network listening BS), for network listening for synchronization signals.

Figure 11:
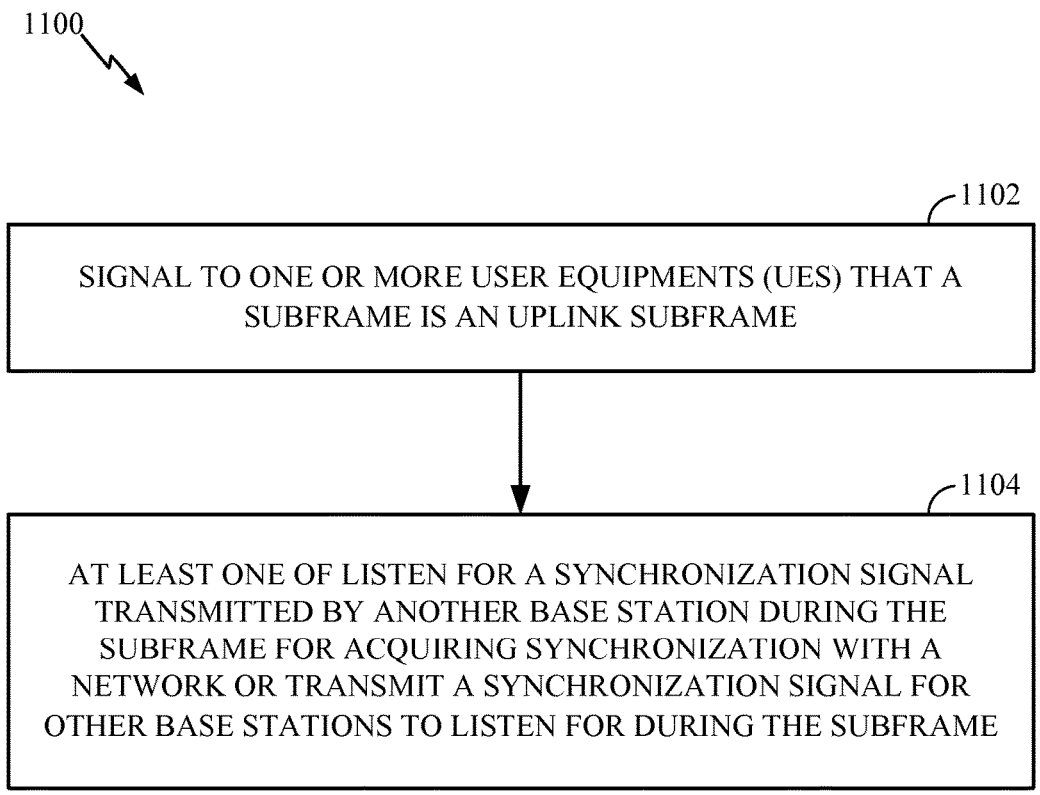
FIG. 11 illustrates example operations for wireless communications that may be performed by a BS, in accordance with certain aspects of the present disclosure.

FIG. 11 illustrates example operations 1100 for wireless communications. The operations 1100 may be performed, for example, by a BS (e.g., HeNB, Pico BS, Femto BS, or relay BS). The operations 1100 may begin, at 1102, by signaling to one or more UEs that a subframe is an uplink subframe.

At 1104, the BS may at least one of listen for a synchronization signal transmitted by another BS during the subframe for acquiring synchronization with a network or transmit a synchronization signal for one or more other BSs to listen for during the subframe. In aspects, the BS may not schedule RACH or any other UL transmissions for the subframe. In aspects, the BS may transmit one or more synchronization signals for other BSs to listen for during the subframe signaled as UL subframe.

Figure 12:
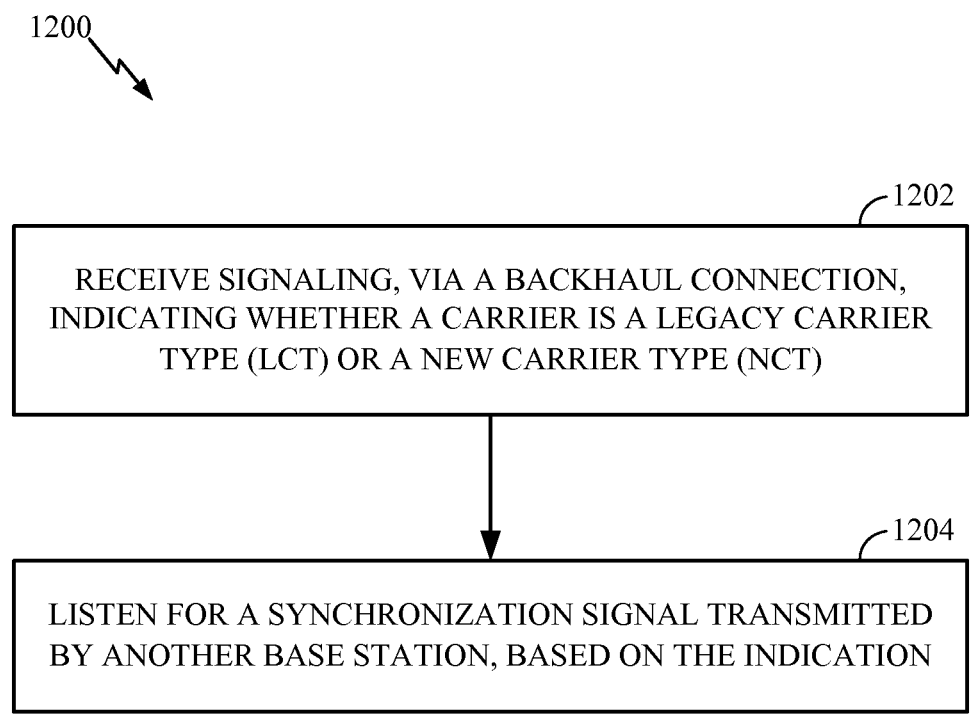
FIG. 12 illustrates example operations for wireless communications that may be performed by a BS, in accordance with certain aspects of the present disclosure.

FIG. 12 illustrates example operations 1200 for wireless communications. The operations 1200 may be performed, for example, by a BS (e.g., HeNB, Pico BS, Femto BS, or relay BS). The operations 1200 may begin, at 1202, by receiving signaling, via a backhaul or over the air connection, indicating whether a carrier is a legacy carrier type (LCT) or a new carrier type (NCT).

At 1204, the BS may listen for a synchronization signal transmitted by another BS, based on the indication.

Figure 13:
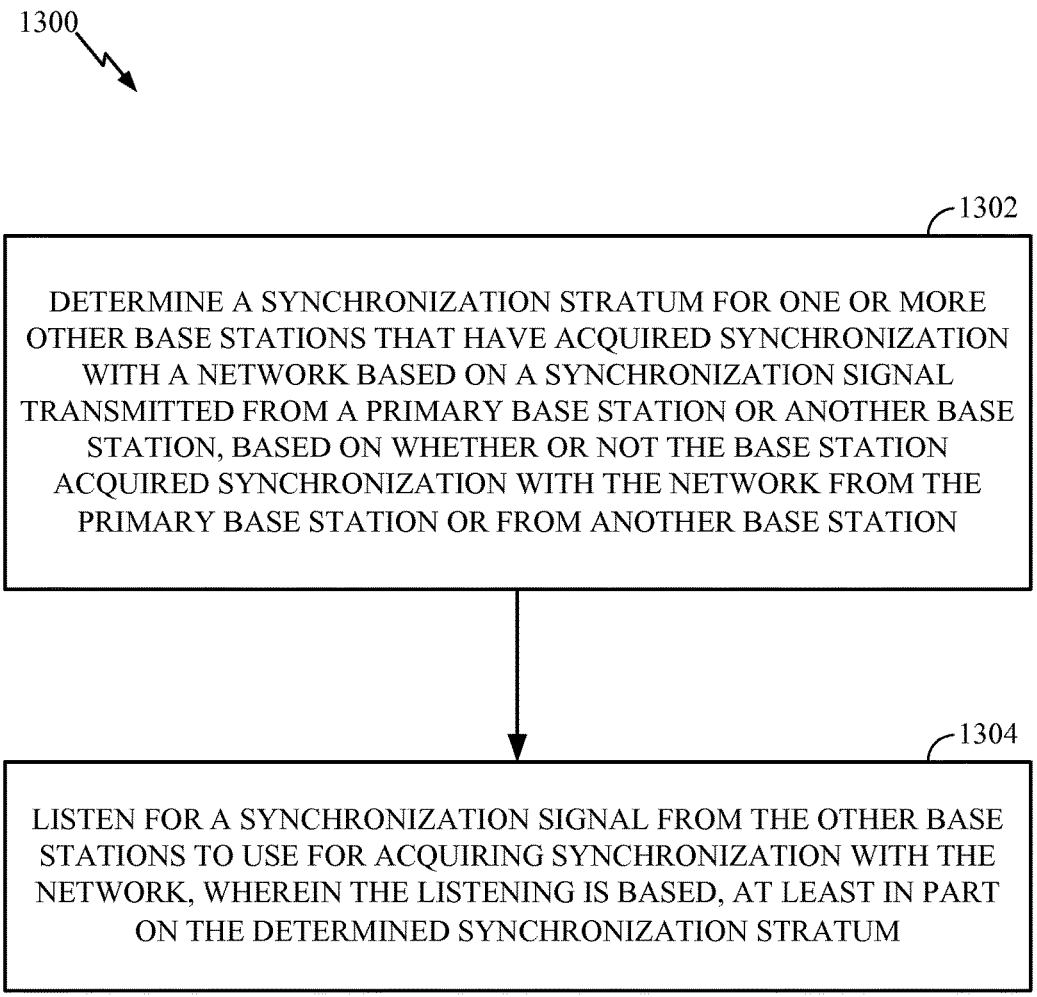
FIG. 13 illustrates example operations for wireless communications that may be performed by a BS, in accordance with certain aspects of the present disclosure.

FIG. 13 illustrates example operations 1300 for wireless communications. The operations 1300 may be performed, for example, by a BS (e.g., HeNB, Pico BS, Femto BS, or relay BS). The operations 1300 may begin, at 1302, by determining a synchronization stratum for one or more other BSs that have acquired synchronization with a network based on a synchronization signal transmitted from a primary BS or another BS, based on whether or not the BS acquired synchronization with the network from the primary BS or from another BS.

At 1304, the BS may listen for a synchronization signal (e.g., PSS, SSS, or CRS) from the other base stations to use for acquiring synchronization with the network, wherein the listening is based, at least in part on the determined synchronization stratum. In aspects, the BS may determine a duty cycle for transmission of the synchronization signal based, at least in part, on the determined synchronization stratum. In aspects, BSs with different synchronization stratums may transmit non-overlapping synchronization signals. In aspects, the synchronization stratum may be determined based on a number of hops between the BS and the primary synchronization source. For example, the synchronization stratum may be proportional to the number of hops. In aspects, a BS with a lower synchronization stratum may transmit synchronization signals more frequently than a BS with a higher synchronization stratum. In aspects, BSs with different synchronization stratums may transmit at least partially overlapping synchronization signals. In aspects, the BS may listen for a SFN transmission from one or more base stations of the same stratum. The SFN transmission may be subframe dependent or location dependent.

Figure 14:
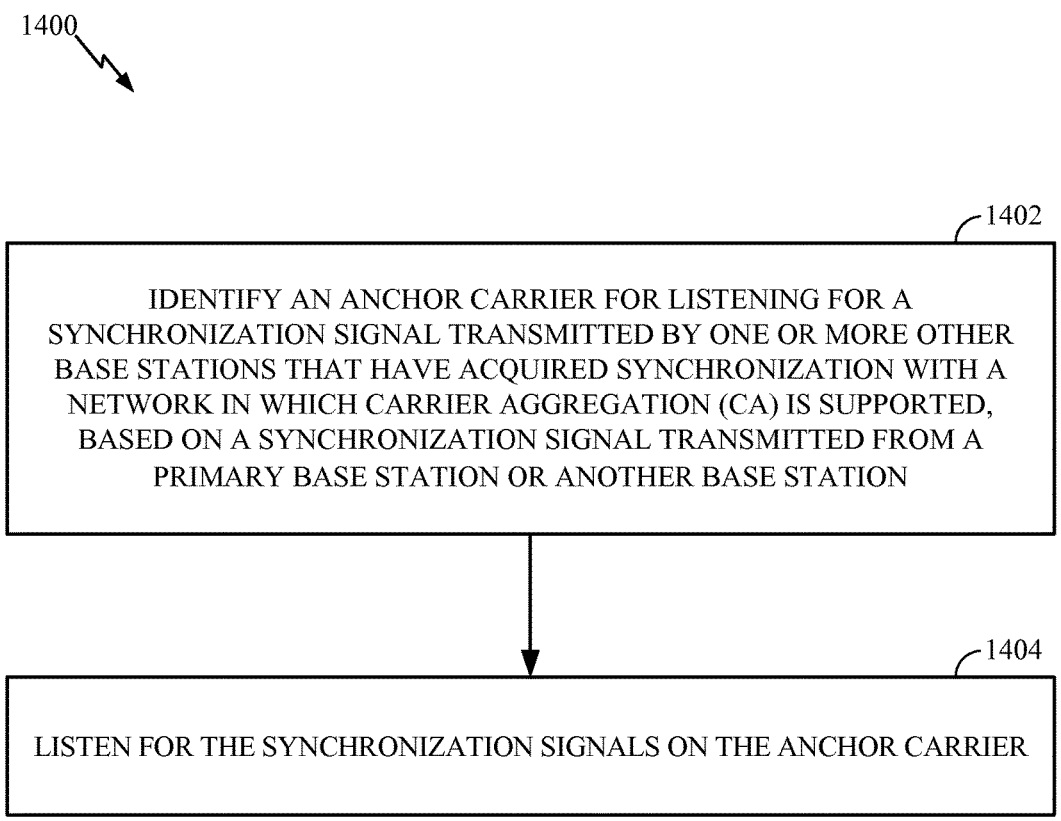
FIG. 14 illustrates example operations for wireless communications that may be performed by a BS, in accordance with certain aspects of the present disclosure.

FIG. 14 illustrates example operations 1400 for wireless communications. The operations 1400 may be performed, for example, by a BS (e.g., HeNB, Pico BS, Femto BS, or relay BS). The operations 1400 may begin, at 1402, by identifying an anchor carrier for listening for a synchronization signal transmitted by one or more other BSs that have acquired synchronization with a network in which CA is supported, based on a synchronization signal transmitted from a primary BS or another BS.

At 1404, the BS may listen for the synchronization signals on the anchor carrier. In aspects, the anchor carrier may be a carrier where CRS or some other DL signals are monitored. In aspects, the anchor carrier may be a carrier on which a repeater is not deployed. In aspects, the BS may determine a repeater is deployed on a carrier based on a backhaul or OTA exchange with another BS.

Figure 15:
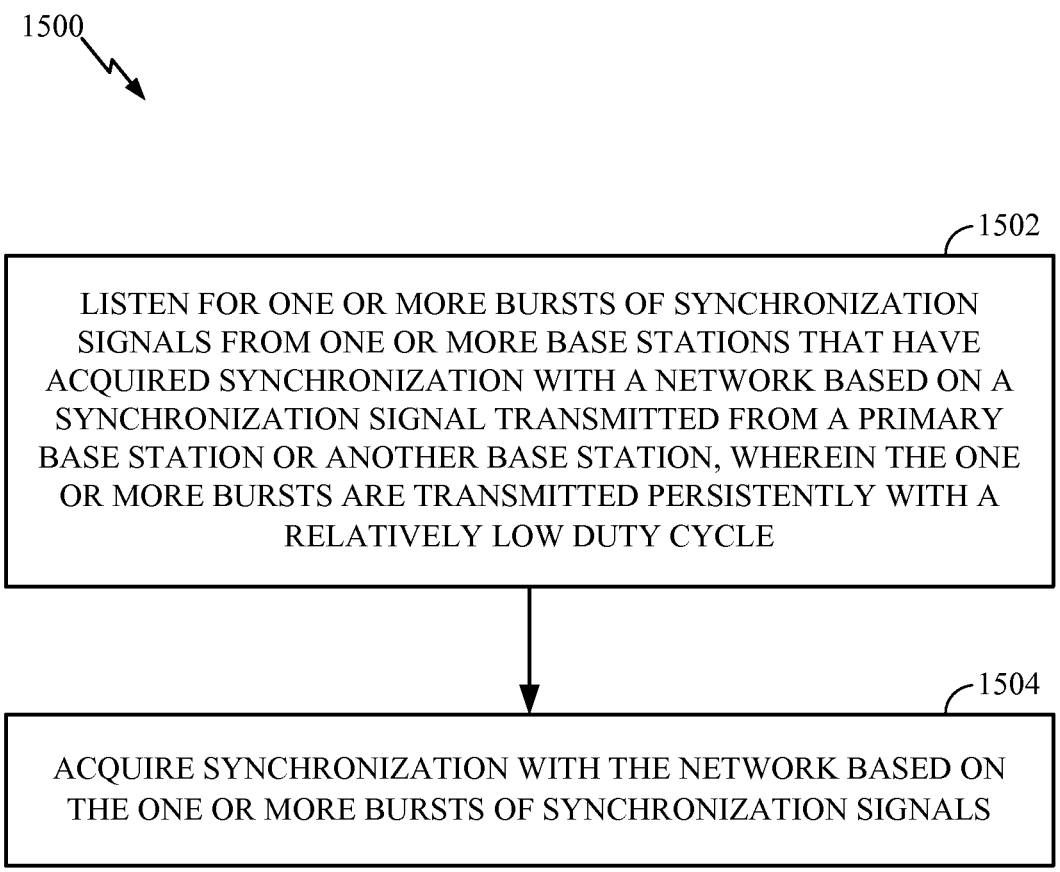
FIG. 15 illustrates example operations for wireless communications that may be performed by a BS, in accordance with certain aspects of the present disclosure.

FIG. 15 illustrates example operations 1500 for wireless communications. The operations 1500 may be performed, for example, by a BS (e.g., HeNB, Pico BS, Femto BS, or relay BS). The operations 1500 may begin, at 1502, by listening for one or more bursts of synchronization signals from one or more BSs that have acquired synchronization with a network based on a synchronization signal transmitted from a primary BS or another BS, wherein the one or more bursts are transmitted persistently with a relatively low duty cycle.

At 1504, the BS may acquire synchronization with the network based on the one or more bursts of synchronization signals. In aspects, the one or more bursts of synchronization signals from different BSs may at least partially overlap. In aspects, the BS listens for the one or more bursts of synchronization signals even when the BS is in a dormant mode or an off mode. In aspects, the bursts may be transmitted with boosted transmission power relative to transmission power for other signals. In aspects, the one or more bursts of synchronization signals may include one or more signals that are intended for a UE or another BS. In aspects, the one or more bursts of synchronization signals may not include a synchronization signal for a UE served by the BS.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover: a, b, c, a-b, a-c, b-c, and a-b-c.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination of the two. A software/firmware module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Generally, where there are operations illustrated in Figures, those operations may have corresponding counterpart means-plus-function components with similar numbering.

In one or more exemplary designs, the functions described may be implemented in hardware, software/firmware or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a base station, comprising:
acquiring synchronization with a network based on a first synchronization signal transmitted from a primary base station or a secondary base station;
determining a synchronization stratum for the base station based on whether the base station acquired synchronization with the network from the primary base station or from the secondary base station;
signaling to one or more user equipments (UEs) that a first subframe is an uplink (UL) subframe;
refraining from scheduling the one or more UEs for at least one UL transmission during the first subframe; and
transmitting a second synchronization signal during the first subframe for one or more other base stations to use for acquiring synchronization with the network, wherein the transmitting is based, at least in part, on the determined synchronization stratum.

2. The method of claim 1, wherein the first synchronization signal and the second synchronization signal each comprise at least one of a primary synchronization signal (PSS), a secondary synchronization signal (SSS), a cell-specific reference signal, a new cell discovery signal or low duty cycle signal for network listening.

3. The method of claim 1, wherein acquiring synchronization with the network based on the first synchronization signal transmitted from the primary base station or the secondary base station comprises:
signaling to the one or more UEs that a second subframe is an UL subframe;
refraining from scheduling any random access channel (RACH) transmissions or UL transmission during the second subframe; and
listening for the first synchronization signal transmitted on the downlink during the second subframe for acquiring the synchronization with the network.

4. The method of claim 1, wherein the transmitting comprises determining a duty cycle for transmitting the second synchronization signal based, at least in part, on the determined synchronization stratum.

5. The method of claim 4, wherein base stations with different synchronization stratums transmit non-overlapping synchronization signals.

6. The method of claim 1, wherein:
the synchronization stratum is determined based on a number of hops between the base station and the primary base station, wherein synchronization stratum is proportional to the number of hops; and
a base station with a lower synchronization stratum transmits synchronization signals more frequently than a base station with a higher synchronization stratum.

7. The method of claim 6, wherein base stations with different synchronization stratums transmit at least partially overlapping synchronization signals.

8. The method of claim 1, wherein the transmitting comprises performing single frequency network (SFN) transmission with one or more base stations of the same stratum.

9. The method of claim 8, wherein the SFN transmission is at least one of subframe dependent or location dependent.

10. The method of claim 1, wherein the base station comprises at least one of a home eNode B, a Pico base station, a femto base station, or a relay base station.

11. A method for wireless communications by a base station, comprising:
acquiring synchronization with a network in which carrier aggregation (CA) is supported, based on a synchronization signal transmitted from a primary base station or a secondary base station;
selecting an anchor carrier for transmitting a second synchronization signal for one or more other base stations to use for acquiring synchronization with the network; and
transmitting the second synchronization signal on the anchor carrier, wherein the second synchronization signal comprises a discovery signal.

12. The method of claim 11, wherein the anchor carrier comprises a carrier where at least one of cell-specific reference signals (CRSs) or some other downlink (DL) signals are monitored.

13. The method of claim 11, wherein selecting the anchor carrier comprises selecting a carrier on which a repeater is not deployed.

14. The method of claim 13, further comprising determining a repeater is deployed on a carrier based on a backhaul or an over-the-air (OTA) exchange with another base station.

15. The method of claim 11, wherein the base station comprises at least one of a home eNode B, a Pico base station, a femto base station, or a relay base station.

16. A method for wireless communications by a base station, comprising:
acquiring synchronization with a network, based on a first synchronization signal transmitted from a primary base station or a secondary base station; and
transmitting one or more bursts of second synchronization signals for one or more other base stations to use for acquiring synchronization with the network, wherein the one or more bursts are transmitted persistently with a relatively low duty cycle, and wherein transmitting the one or more bursts of second synchronization signals includes transmitting the one or more bursts of second synchronization signals even when the base station is in a dormant or off mode.

17. The method of claim 16, wherein the one or more bursts of second synchronization signals at least partially overlap with one or more bursts of third synchronization signals from a different base station.

18. The method of claim 16, further comprising boosting transmission power for transmitting the one or more bursts of second synchronization signals, relative to transmission power for other signals.

19. The method of claim 16, wherein the one or more bursts of second synchronization signals include one or more signals that are intended for at least one of a user equipment or another base station.

20. The method of claim 16, wherein the base station comprises at least one of a home eNode B, a Pico base station, a femto base station, or a relay base station.

21. The method of claim 16, wherein the second synchronization signal comprises a discovery signal.

22. The method of claim 16, wherein the second synchronization signal comprises a new signal that is not a primary synchronization signal (PSS), a secondary synchronization signal (SSS), a cell-specific reference signal (CRS), or a discovery signal.

23. An apparatus for wireless communications by a base station, comprising:
a processor configured to:
acquire synchronization with a network based on a first synchronization signal transmitted from a primary base station or a secondary base station;
determine a synchronization stratum for the base station based on whether the base station acquired synchronization with the network from the primary base station or from the secondary base station;
signal to one or more user equipments (UEs) that a first subframe is an uplink (UL) subframe;
refrain from scheduling the one or more UEs for at least one UL transmission during the first subframe; and
transmit a second synchronization signal during the first subframe for one or more other base stations, wherein the transmitting is based, at least in part, on the determined synchronization stratum; and
a memory coupled to the processor.

24. The apparatus of claim 23, wherein the first synchronization signal and the second synchronization signal each comprise at least one of a primary synchronization signal (PSS), a secondary synchronization signal (SSS), a cell-specific reference signal, a new cell discovery signal or low duty cycle signal for network listening.

25. The apparatus of claim 23, wherein acquiring synchronization with the network based on the first synchronization signal transmitted from the primary base station or the secondary base station comprises:
signaling to the one or more UEs that a second subframe is an UL subframe;
refraining from scheduling any random access channel (RACH) transmissions or UL transmission during the second subframe; and
listening for the first synchronization signal on the downlink during the second subframe for acquiring the synchronization with the network.

26. The apparatus of claim 23, wherein:
the synchronization stratum is determined based on a number of hops between the base station and the primary base station, wherein synchronization stratum is proportional to the number of hops; and
a base station with a lower synchronization stratum transmits synchronization signals more frequently than a base station with a higher synchronization stratum.

27. The apparatus of claim 26, wherein base stations with different synchronization stratums transmit at least partially overlapping synchronization signals.

28. The apparatus of claim 23, wherein the base station comprises at least one of a home eNode B, a Pico base station, a femto base station, or a relay base station.

* * * * *